United States Patent [19]
Berrie et al.

[11] 3,936,436
[45] Feb. 3, 1976

[54] WATER-SOLUBLE AZO DYESTUFFS CONTAINING TRIAZINE AND 3-AZO-2,6-DIHYDROXYPYRID-6-ONE RADICALS

[75] Inventors: Alistair Howard Berrie; Richard Budziarek, both of Manchester, England

[73] Assignee: Imperial Chemical Industries Limited, London, England

[22] Filed: May 2, 1973

[21] Appl. No.: 356,421

Related U.S. Application Data

[63] Continuation of Ser. No. 100,449, Dec. 21, 1970, abandoned, which is a continuation-in-part of Ser. No. 860,033, Sept. 22, 1969, abandoned.

[30] Foreign Application Priority Data
Dec. 22, 1969  United Kingdom............... 60322/69
July 27, 1970  United Kingdom............... 36199/70

[52] U.S. Cl......... 260/153; 260/146 R; 260/146 D; 260/146 T; 260/154; 260/156; 260/248 NS; 260/295 AM; 260/295.5 R; 260/295.5 A; 260/297 R
[51] Int. Cl.²............... C09B 62/08; C09B 62/24; C09B 62/40; C09B 62/50
[58] Field of Search............ 260/146 D, 146 T, 153, 260/154, 156

[56] References Cited
UNITED STATES PATENTS

| | | | |
|---|---|---|---|
| 2,768,158 | 10/1956 | Strobel et al. | 260/153 |
| 2,953,560 | 9/1960 | Baker et al. | 260/153 |
| 2,964,520 | 12/1960 | Baker et al. | 260/153 |
| 3,162,628 | 12/1964 | Berrie et al. | 260/153 X |
| 3,487,066 | 12/1969 | Ritter et al. | 260/156 |
| 3,639,662 | 2/1972 | Griffiths et al. | 260/146 T |
| 3,640,674 | 2/1972 | Berrie et al. | 260/156 X |
| 3,646,002 | 2/1972 | Andrew et al. | 260/146 T |
| 3,647,778 | 3/1972 | Andrew et al. | 260/153 |
| 3,657,214 | 4/1972 | Berrie et al. | 260/156 |
| 3,658,782 | 4/1972 | Griffiths et al. | 260/153 |
| 3,725,383 | 4/1973 | Austin et al. | 260/146 T |

*Primary Examiner*—Floyd D. Higel
*Attorney, Agent, or Firm*—Cushman, Darby & Cushman

[57] ABSTRACT

A new class of cellulose reactive dyes have a sulphonated benzene, naphthalene or naphthalene azobenzene diazo component coupled on to a class of coupling components of the formula:

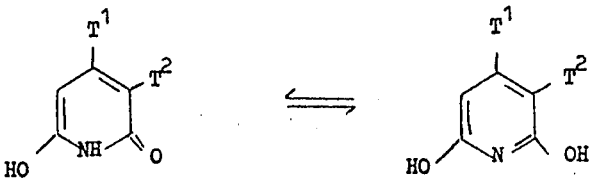

in which $T^1$ is H, monocyclic aryl, OH, $CO_2H$, aminocarbonyl, lower alkyl, lower alkoxy and lower alkoxycarbonyl, $T^2$ is H, $CO_2H$, lower alkyl, lower alkoxy, monocyclic aryl, benzyl, aminocarbonyl and lower alkoxycarbonyl, the diazo component carrying a cellulose-reactive group. Also included are dyes in which two moles of such a monoazo dye are linked through a diamine radical. Cr and Co complexes of dyes in which the diazo component is a o-aminophenol or o-aminonaphthol are included. These dyes are usefully employed to color cellulose, wool or polyamide textile materials. These dyes impart to the textile materials deep shades having excellent fastness to light and to the wet treatments which are commonly applied to cellulose textile materials.

4 Claims, No Drawings

WATER-SOLUBLE AZO DYESTUFFS CONTAINING TRIAZINE AND 3-AZO-2,6-DIHYDROXYPYRID-6-ONE RADICALS

This is a continuation of application Ser. No. 100,449 filed Dec. 21, 1970, now abandoned, which in turn is a continuation-in-part of application Ser. No. 860,033, filed Sept. 22, 1969 now abandoned.

This invention relates to reactive dyestuffs and more particularly it relates to water-soluble azo dyestuffs containing fiber-reactive groups which are particularly valuable for coloring polyamide and cellulose textile materials.

It has been found that water-soluble compounds containing a sufficient number of sulphonic acid groups to provide water-solubility, one or more cellulose-reactive groups and at least one 3-azo-2,6-dihydroxypyrid-6-one radical, are valuable dyestuffs capable of affording deep shades of excellent fastness on cellulose, wool or polyamide textile materials. That is to say, the invention provides the novel concept of utilising 2,6-dihydroxy pyridine and certain substituted 2,6-dihydroxypyridine coupling components to form cellulose-reactive dyestuffs, the fiber-reactive group also certain derivatives substituted in the 4 and/or 5-position of the pyridine nucleus, either being present in the components coupled together to form the dyestuff or being introduced into an azo dyestuff already containing the 2,6-dihydroxypyridine radical.

I. General description of the new dyestuffs

The new dyestuffs may be characterised by the presence of at least one sulphonic acid group, at least one cellulose-reactive group and at least one group of the formula:

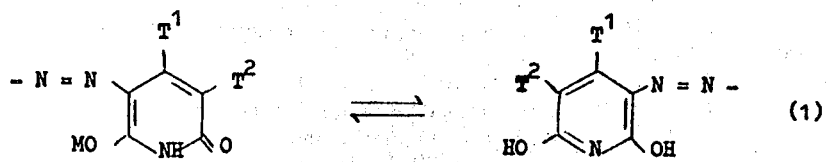

wherein $T^1$ represents a hydrogen atom, a $COOR^1$, $CONR^1R^2$, or OH group wherein $R^1$ and $R^2$ each independently represents a hydrogen atom or an alkyl group or an alkyl or aryl radical which may be substituted; $T^2$ represents a hydrogen atom, $COOR^1$, $CONR^1R^2$ group or an alkyl, aralkyl or aryl radical which may be substituted, and M represents a hydrogen atom or a metal atom forming part of a metal-complex system in the dyestuff.

One class of water-soluble azo dyestuffs of the invention may be represented by the formula:

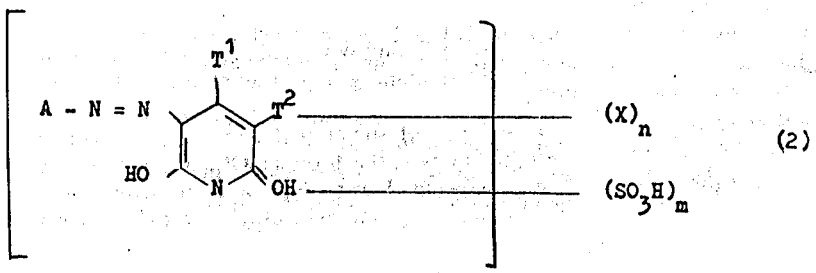

wherein A represents a benzene or naphthalene nucleus, X is a fiber-reactive group; $T^1$, $T^2$, $R^1$ and $R^2$ have the meanings stated above; $n$ is a positive integer of at least 1 and $m$ is a positive integer of at least 1.

The azo dyestuffs of the invention can exist in a number of tautomeric forms; for convenience the dyestuffs have only been formulated in one of these tautomeric forms, but it is to be understood that this specification relates to dyestuffs in any of the possible tautomeric forms.

The radical represented by A is a naphthalene nucleus or a benzene nucleus preferably carrying at least one sulphonic acid or carboxylic acid and a fiber-reactive group X.

Yet a further class of dyestuffs of the invention are represented by formula (2) wherein A stands for a radical of the azo benzene, azonaphthalene or phenylazonaphthalene series.

The invention also relates to disazo dyestuffs which may be regarded as 2 molecules of the dyestuffs of formula (2) joined together through the radical A by a direct link or a bridging atom or group such as —O—, —S—, —NH—, —CH=CH—, —OCH$_2$CH$_2$O—, —CONH— or —NHCONH—.

When the radical A contains a metallizable group, for example a hydroxy or carboxylic acid group, in ortho position to the azo group, then such dyestuffs can form metal complexes, and such metal complexes form further classes of dyestuffs of the invention.

The fiber-reactive group represented by X is a group whose presence in the dyestuff molecule renders the dyestuff capable of chemically combining with hydroxy groups present in cellulose textile materials or with amino groups present in polyamide textile materials. The fiber-reactive groups represented by X are attached to carbon atoms present in the dyestuff molecule and preferably to carbon atoms of aromatic rings, especially benzene rings, present in the dyestuff molecule.

As examples of fiber-reactive groups there may be mentioned acylamino radicals derived from olefinically unsaturated aliphatic carboxylic acids such as acryloylamino and crotonylamino, or from halogen-substituted aliphatic carboxylic acids such as β-chloropropionylamino, β-bromopropionylamino and β:γ:γ-trichloro-crotonylamino. Alternatively X can be a vinyl sulphone, β-chloroethyl sulphone, β-sulphatoethylsulphonyl, β-chloroethyl-sulphonamide or an optionally N-substituted β-aminoethylsulphonyl group.

The fiber-reactive group is preferably a heterocyclic radical having two or three nitrogen atoms in the heterocyclic ring and at least one labile substituent attached to a carbon atom of the heterocyclic ring. As examples of labile substituents there may be mentioned chlorine, bromine, quaternary ammonium groups, thiocyano, sulphonic acid, hydrocarbylsulphonyl groups, groups of the formula

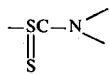  (3)

wherein the nitrogen atom carries optionally substituted hydrocarbon or heterocyclic radicals, and groups of the formula:

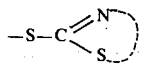  (4)

wherein the dotted line indicates the atoms necessary to form an optionally substituted or fused heterocyclic ring.

As specific examples of such fiber-reactive heterocyclic radicals there may be mentioned 2:3-dichloroquinoxaline-5- or -6-(sulphonyl or carbonyl-)amino, 2:4-dichloroquinoazoline-6- or -7-sulphonylamino, 2:4:6-trichloroquinazoline-7- or -8-sulphonylamino, 2:4:7- or 2:4:8-trichloroquinazoline-6-sulphonylamino, 2:4-dichloroquinazoline-6-carbonylamino, 1:4-dichlorophthalazine-6-carbonylamino, 4:5-dichloropyridazon-1-ylamino, 2:4-dichloropyrimid-5-ylcarbonylamino, 1-(phenyl-4'-carbonylamino)4:5-dichloropyridazone, 1-(phenyl-4'-sulphonylamino)4:5-dichloropyridazone, 2:4- and/or 2:6-dichloro- or bromo-)pyrid-6(and/or -4)ylamino, trichloro-pyrimidylamino, tribromopyridylamino, dichloro-5-(cyano, nitro, methyl or carbomethoxy)-pyrimidylamino, 2-methylsulphonyl-6-chloropyrimid-4-ylcarbonylamino and 5-chloro-6-methyl-2-methylsulphonyl pyrimid-4-ylamino, and more particularly 1:3:5-triazin-2-ylamino radicals which contain a bromine and, above all, a chlorine atom on at least one of the 4- and 6-positions, for example 4:6-dichloro-1:3:5-triazin-2-ylamino. When the triazine nucleus contains only a single chlorine atom then the third carbon atom of the triazine ring can be substituted by a hydrocarbon radical, such as methyl or phenyl, but more particularly by an optionally substituted hydroxy, mercapto or amino group, such as methoxy, phenoxy, α- and β-naphthoxy, methylmercapto, phenythio, methylamino, diethylamino, cyclohexylamino and anilino and N-alkylaniline and substituted derivatives thereof such as anisidine, toluidino, carboxylanilino, sulphoaniline, disulphoanilino and sulphonated naphthylamino.

If desired the fiber-reactive group can be of the type:
-NH-L¹-Q-L²
wherein L¹ is a pyrimidine or triazine ring optionally carrying a labile atom or substituent, L² is a pyrimidine or triazine ring carying at least one labile atom or substituent and Q is a bridging member which is linked to L¹ and L² through optionally substituted imino groups, said imino groups being linked together through an alkylene or arylene radical such as ethylene, 1:4-phenylene or 2-sulpho-1:4-phenylene.

Throughout the Specification the terms "lower alkyl" and "lower alkoxy" are used to denote alkyl and alkoxy radicals respectively containing from 1 to 4 carbon atoms.

The alkyl radicals represented by $T^1$, $T^2$, $R^1$ and $R^2$ are preferably lower alkyl radicals, and as specific examples of such radicals there may be mentioned methyl, ethyl, n-propyl and n-butyl.

As examples of aralkyl radicals represented by $R^2$ there may be mentioned benzyl and β-phenylethyl. The optionally substituted aryl radicals represented by $T^1$ and $T^2$ are preferably optionally substituted phenyl radicals and as specific examples of such radicals there may be mentioned phenyl, tolyl, chlorophenyl, and methoxyphenyl.

A preferred class of the azo dyestuffs of the invention comprises the dyestuffs which, in one of the possible tautomeric forms, are represented by the formula:

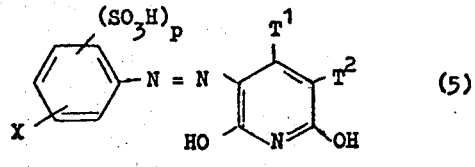  (5)

wherein $T^1$ and $T^2$ have the meanings stated, the fiber-reactive group represented by X is attached to the benzene ring in meta or para position to the azo group, and p is 1 or 2.

Within this generally preferred class, a number of particular meanings of the symbols $T^1$ and $T^2$ can be emphasized as being the special value. Thus $T^1$ is preferably selected from the class consisting of H, lower alkyl, phenyl, anisyl, tolyl, $NH_2$-CO, OH, $CO_2H$, lower alkoxycarbonyl, and (lower alkoxycarbonyl) lower alkyl; above all, the preferred meaning of $T^1$ is methyl. $T^2$ is preferably selected from the class consisting of H, $CO_2H$, $CONH_2$, lower alkyl, phenyl, benzyl, chlorophenyl and lower alkoxycarbonyl; the preferred meanings of $T^2$ are H and $CONH_2$.

Generally, the preferred meaninng of X is one of the following:
β-sulphatoethylsulphonyl
β-sulphatoethylsulphonylamino
dichloropyrimidinylamino
trichloropyrimidinylamino
or a group of the formula:

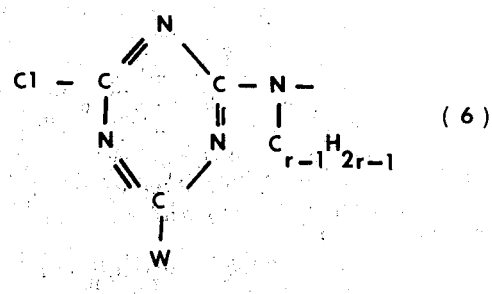  (6)

wherein r is 1 or 2, and W is a chlorine atom, an optionally substituted amino group or an etherified hydroxyl group.

A wide range of substituted amino groups can be represented by W in this formula. Of particular interest are the following: lower alkyl- and di-(lower alkyl-)amino groups, e.g. methyl-, ethyl-, propyl- and isopropyl-amino-, dimethyl-, diethyl-, N-ethyl-N-methyl-amino; hydroxyl- or lower alkoxy- substituted lower alkyl groups, e.g.:
 β-hydroxyethylamino,
 di-(β-hydroxyethylamino),
 γ-methoxypropylamino,
 β-ethoxyethylamino;
anilino groups which may contain as substituents $CH_3$, Cl, $OCH_3$, $CO_2H$ and/or $SO_3H$, e.g.:
 o-, m- and p-sulphoanilino
 2-methyl-4- and 5-sulphoanilino
 2-chloro-4- and 5-sulphoanilino
 2-methoxy-4- and 5-sulphoanilino
 2-carboxy-4- and 5-sulphoanilino
 2,4-, 2,5- and 3,5-disulphoanilino;
naphthylamine radicals containing 1, 2 or 3 $SO_3H$ groups, e.g.:
 2,3,4,5,6,7 and 8-sulphonaphth-2-ylamino
 1,3,4,5,6,7 and 8-sulphonaphth-2-ylamino
 3,6-, 4,8- and 3,8-disulphonaphth-1-ylamino
 1,5-, 5,7- and 6,8-disulphonaphth-2-ylamino
 3,6,8-trisulpho-naphth-1- and 2-ylamino;
N-alkylated anilino groups, e.g.:
 N-methyl-m-sulphoanilino
 N-ω-sulphomethylanilino
 N-(β-hydroxyethyl)p-sulphoanilino.

Furthermore the group W can include within its scope groups which contain a chromophoric system linked to the carbon atom of the triazine ring through -NH- or -O-. Such chromophoric systems are preferably of the azo, anthraquinone or phthalocyanine series.

W can also represent the radical of a diamine in which the terminal N atom carries a chloro substituted s-triazine group i.e. is represented by formula (6). That is to say, the fiber-reactive group X may be represented by the formula:

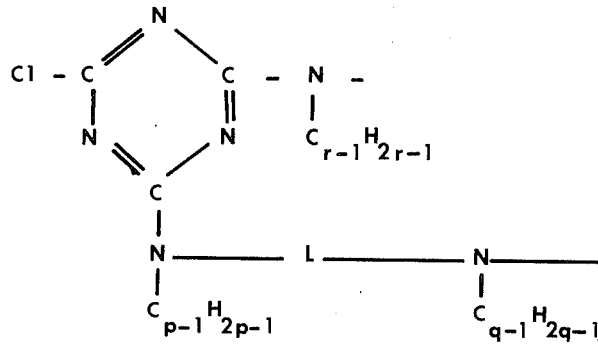

wherein r, p and q are each independently 1 or 2, W is a chlorine atom or an optionally substituted amino group or an etherified hydroxyl group, and L is a divalent bridging group in particular an optionally substituted alkylene or arylene (preferably phenylene) radical.

As particular examples of bridging groups represented by L there may be mentioned the N,N' divalent radicals of:
 hydrazine,
 piperazine,
 ethylene, 1,2- and 1,3-propylene and 1,6-hexamethylene diamines,
 1,3-phenylenediamine-4-sulphonic acid and 2,6-disulphonic acid,
 1,4-phenylenediamine-2-sulphonic acid and 2,5-disulphonic acid,
 1,3- and 1,4-phenylenediamines,
 benzidine and benzidine-2,2'-disulphonic acid,
 4,4'-diaminodiphenylurea and its 2,2'- and 3,3'-disulphonic acids,
 3,3'-diaminodiphenylurea,
 4,4'-diaminodiphenylmethane,
 2,6-diaminonaphthalene-1,5-disulphonic acid,
 1,5-diaminonaphthalene-3,7-disulphonic acid,
 4,4'-diaminodiphenylsulphone,
 4,4'-diaminodiphenylether,
 4,4'-diaminostilbene-2,2'-disulphonic acid,
 4,4'-diaminodiphenoxyethane-2,2'-disulphonic acid, A particular case of dyes containing the group of formula 7 occurs when the symbol W represents the radical of an aminoazo compound of formula (5) i.e. where the dyestuff is a disazo compound having two identical monoazo compounds, each containing a monochloro-s-triazine group and linked together through the third carbon atoms of each triazine ring by a divalent bridging group.

As examples of etherified hydroxyl groups represented by W in formula (6) and (7), there may be mentioned lower alkoxy, e.g. methoxy, ethoxy, butoxy, lower alkoxy-substituted lower alkoxy, e.g. methoxyethoxy, ethoxyethoxy, γ-methoxypropoxy also phenoxy, tolyloxy, sulpho and disulphophenoxy groups.

II. Manufacture of the new dyestuffs

The new dyestuffs can be obtained by the conventional coupling and where necessary condensation and-/or metallization reactions used for manufacture of cellulose-reactive dyestuffs characterised by use in the coupling stage of a 2,6-dihydroxypyridine compound.

Thus the metal-free azo dyestuffs of the invention may be obtained by diazatizing an amine of the formula $A-NH_2$ or tetrazotizing a diamine of the formula $NH_2-A-NH_2$ and coupling the resulting diazo compound with a coupling component which in one of the possible tautomeric forms is represented by the formula:

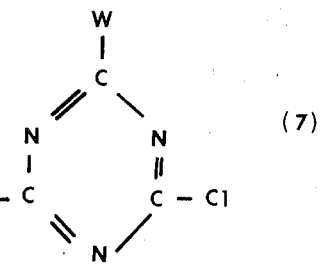

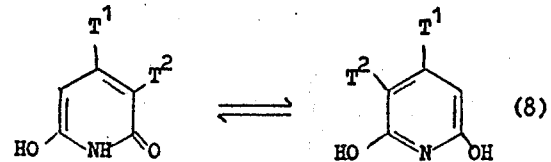

wherein A, $T^1$ and $T^2$ have the meanings stated above, the amine containing at least one fiber-reactive group and at least one sulphonic acid group.

The diazotizing and coupling stages of this process can be carried out in conventional manner, but are preferably carried out in an acid or at most weakly alkaline aqueous medium so as to reduce the possibility of hydrolysis of the fiber-reactive groups present.

Amines of the formula $A-NH_2$ which contain a fiber-reactive group can be obtained by condensing a compound of the formula X-halogen with the appropriate diamine, for example with 1:4-phenylenediamine-2:5-disulphonic acid, under such conditions that only one of the two amino groups reacts with the compound of the formula X-halogen.

Other suitable diamines for this purpose are: 1,3-phenylenediamine-4-sulphonic acid and 2,6-disulphonic acid, 1,4-phenylenediamine-2-sulphonic acid and 2,6-diaminonaphthalene-4,8-disulphonic acid.

The coupling components of Formula 8 can be obtained by a number of methods such as are described for example, in "Heterocyclic Compounds — Pyridine and its derivatives - Part 3" which was edited by Klingsberg and published by Interscience Publishers in 1962. Typical methods include, for example, (1) condensing together compounds of the formula $T^1COCH_2COO$ alkyl and $T^2CH_2COO$ alkyl in the presence of an excess of ammonia, (2) cyclization of an $\alpha:\beta$-disubstituted glutaconamide of the formula

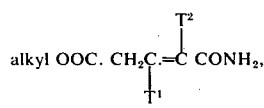

which is itself obtained by condensing together in the presence of a basic catalyst compounds of the formulae $T^1COCH_2COO$ alkyl and $T^2CH_2CONH_2$, or (3) cyclization of an $\alpha:\beta$-disubstituted glutaconamide of the formula:

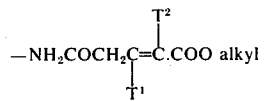

which is itself obtained by condensing together compounds of the formulae $T^1COCH_2CONH_2$ and $T^2CH_2COO$ alkyl.

As specific examples of coupling components of formula (8) there may be mentioned:

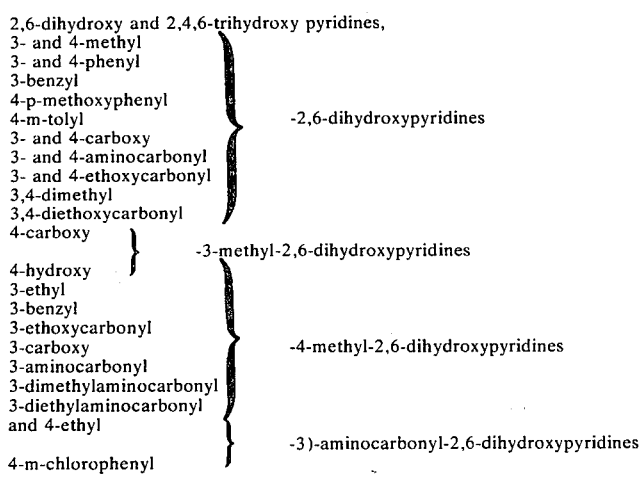

As examples of compounds of the formula X-halogen which can be reacted with amines of the formula A-NH$_2$ there may be mentioned acryloyl chloride, $\beta$-chloropropionyl chloride, $\beta$-bromo-propionyl bromide, chloroacetyl chloride, $\alpha:\beta$-dichloropropionyl chloride, 2:3-dichloroquinoxaline-5- or 6-carbonyl chloride, 2:3-dichloroquinazoline-5- or 6-sulphonyl chloride, 2:4-dichloroquinazoline-6- or 7-sulphonyl chloride, 2:4:6-trichloroquinazoline-7- or 8-sulphonyl chloride, 2:4:7- or 2:4:8-trichloroquinazoline-6-sulphonyl chloride, 2:4-dichloroquinazoline-6-carbonylchloride, 2:4-dichloropyrimidine-5-carbonyl chloride, 2-methylsulphonyl-6-chloropyrimidine-4-carbonyl chloride, $\beta$-(4:5-dichloropyrioaz-6-on-1-yl)propionyl chloride, 1-(4'-chlorocarbonylphenyl)-4:5-dichloro-6-pyridazone, 1-(4'-chlorosulphonylphenyl)-4:5-dichloro-6-pyridazone, 2:4:6-trichloropyrimidine, 2:4:6-tri(chloro or bromo)-5-(methyl, nitro- or cyano-)pyrimidine, 2:4:5:6-tetrachloropyrimidine, 2:4-dichloro-5-nitro-6-methylpyrimidine, 5-carboethoxy-2:4:6-trichloropyrimidine, 2:4:6-tribromopyrimidine, 2:4:6-trifluoro-pyrimidine, cyanuric chloride, cyanuric bromide, the primary condensation products of cyanuric chloride with ammonia, amines, organic hydroxy or mercapto compounds, such as methanol, ethanol, phenol, $\alpha$-naphthol, $\beta$-naphthol, chlorophenols, cresols, sulphonated phenols, thiophenol, thioglycollic acid, methyl mercaptan, dimethyldithiocarbamic acid, 2-mercaptobenzthiazole, thioacetamide, primary alkylamines such as methylamine, ethylamine, n-propylamine, dimethylamine and diethylamine, $\beta$-hydroxyethylamine, di($\beta$-hydroxyethyl)amine, piperidine, morpholine, $\beta$-methoxyethylamine, aminoacetic acid, aniline, N-methylaniline, toluidine, anisidine, aniline-2:5-, 2:4- and 3:5-disulphonic acids, aniline o-, m- and p-sulphonic acid, N-methylaniline o-, m- and p-sulphonic acid, o-, m- and p-aminobenzoic acid, 4- and 5-sulpho-2-aminobenzoic acid, 2-aminotoluene-4-sulphonic acid, 5-amino-2-hydroxybenzoic acid, $\beta$-aminoethane sulphonic acid, N-methylaminoethane sulphonic acid and mono- and di-sulphonic acids of 1-amino- and 2-aminonaphthalene.

An alternative process for the manufacture of the azo dyestuffs of the invention which contain the fiber-reactive group attached through an amino group comprises reacting an azo dyestuff of the formula:

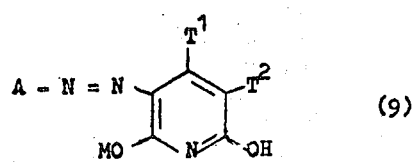

(9)

wherein A, M, T¹ and T² have the meanings stated above and in which A contains an amino group and at least one sulphonic acid group, with a compound of the formula: X-halogen, wherein halogen is chlorine or bromine and X has the meaning stated, one molecular proportion of the halogen compound being used for each amino or alkylamino group present in the dyestuff.

This alternative process of the invention can be conveniently carried out by stirring the azo dyestuff containing the amino group and the halogen compound together in water or in a mixture of water and a water-soluble organic liquid such as acetone, and gradually adding an acid binding agent such as sodium carbonate to neutralise the acid formed in the reaction. The resulting fiber-reactive dyestuff can then be isolated by conventional methods.

The said azo dyestuffs of the invention containing an amino group can themselves be obtained by diazotizing an amine of the formula A-NH₂ and coupling the resulting diazo compound with a coupling component of Formula 8, the amine containing a second amino group which is less readily diazotized or a group such as a nitro or acetylamino group which is readily converted to an amino group after coupling is complete. When it is desired to prepare metal complexes of the azo dyestuffs of the invention then it is preferred to prepare the metal complex of the corresponding dyestuff containing an amino group by treating the dyestuff with a solution of a metal compound, and subsequently reacting the metallized dyestuff containing an amino group with a compound of the formula X-halogen.

The new fiber-reactive azo dyestuffs of the invention which contain as the reactive group a 1:3:5-triazine nucleus substituted by a chlorine atom and by an optionally substituted amino group can also be obtained by reacting the corresponding dyestuff containing a 1:3:5-triazine nucleus substituted by two chlorine atoms with ammonia or the appropriate primary or secondary amine under such conditions that one of the chlorine atoms attached to the 1:3:5-triazine nucleus is replaced by an optionally substituted amino group.

The new fiber-reactive azo dyestuffs of the invention which contain as the reactive group a 1:3:5-triazine or pyrimidine nuclei substituted by a quaternary ammonium group or one or more

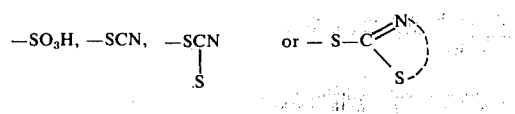

groups (as previously defined) can also be obtained by reacting the corresponding dyestuff containing one or more chlorine or bromine atoms attached to the 1:3:5-triazine or pyrimidine nuclei with a tertiary amine (such as trimethylamine and pyridine), an alkali metal sulphite, an alkali metal salt of a dithiocarbamate or an alkali metal salt of a 2-mercaptothiazole (such as 2-mercaptobenzthiazole).

The new reactive azo dyestuffs of the invention are particularly valuable for coloring cellulose textile materials, to which they are applied by dyeing, padding or printing processes in conjunction with a treatment with an alkaline agent. The dyestuffs have excellent build-up properties and the resulting colourations have excellent fastness to light and to the wet treatment which are commonly applied to cellulose textile materials.

The invention is illustrated but not limited by the following Examples in which parts and percentages are by weight:

SECTION A

This section describes the manufacture of examples of monoazo dyestuffs of the invention by coupling the diazonium salt of an amine containing a cellulose-reactive group with a 2,6 dihydroxypyrid-2-one coupling component.

EXAMPLE 1

A solution of 7.4 parts of cyanuric chloride in 50 parts of acetone is added with stirring to 100 parts of water at 0° to 4°C. A solution of the disodium salt of 11.6 parts of 1:3-diaminobenzene-4,6-disulphonic acid in 120 parts of water is then added, the temperature of the mixture being maintained at 0° to 4°C by external cooling. After the reaction is complete the pH of the mixture is raised to between 6.5 and 7 by the addition of sodium carbonate and a solution of the sodium salt of 6.93 parts of metanilic acid in 100 parts of water is added. The mixture is then stirred for 4 hours at 30° to 40° while the pH of the mixture is maintained between 4.5 and 6 by the addition of sodium carbonate. The resulting solution is cooled to 0°C, 20 parts of a 2N aqueous solution of sodium nitrite are added, followed by 12 parts of a concentrated aqueous solution of hydrochloric acid. The mixture is stirred for 30 minutes and the excess nitrous acid is then destroyed by the addition of sulphamic acid. The resulting mixture containing the diazo compound is added with stirring to a slightly alkaline solution of 6.2 parts of 2,6-dihydroxynicotinic acid in 200 parts of water at 0° to 4°C, and the pH is adjusted to between 7.5 and 8.0. After coupling is completed, acetic acid is added to lower the pH to 6.0, the temperature is raised to 20°C, and the dyestuff precipitated by the addition of sodium chloride. The dyestuff is then filtered off and dried.

When applied to cotton and viscose rayon textile materials in conjunction with a treatment with an acid-binding agent the dyestuff yields bright greenish-yellow shades having excellent fastness to wet treatments such as washing and to light.

EXAMPLE 2 TO EXAMPLE 153

The following Table depicts further examples of the invention obtained in similar manner to Example 1 by condensing the diamine named in column II with one mole of the acid chloride compound named in column I and diazotizing and coupling the resultant amino compound with the coupling component named in column III. The shade of the dyestuff obtained is stated in the final column.

| Example | I | II | III | IV Shade |
|---|---|---|---|---|
| 2 | 2,4-dichloro-6-m-sulphoanilino-s- | 1,3-phenylenediamine-4,6-disulphonic acid | 2,6-dihydroxy pyridine | Greenish Yellow |

-continued

| Example | I | II | III | IV Shade |
|---|---|---|---|---|
| | triazine | | | |
| 3 | -do- | -do- | 2,6-dihydroxy-4-methylpyridine | -do- |
| 4 | -do- | -do- | 2,6-dihydroxy-4-phenylpyridine | -do- |
| 5 | -do- | -do- | 2,6-dihydroxy-4-(4'-methoxy-phenyl)pyridine | -do- |
| 6 | -do- | -do- | 2,6-dihydroxy-4-(3'-methyl-phenyl)pyridine | -do- |
| 7 | -do- | -do- | 2,6-dihydroxy-3-methylpyridine | -do- |
| 8 | -do- | -do- | 2,6-dihydroxy-3-phenylpyridine | -do- |
| 9 | -do- | -do- | 2,6-dihydroxy-3-benzylpyridine | -do- |
| 10 | -do- | -do- | 2,6-dihydroxy-3,4-dimethyl-pyridine | -do- |
| 11 | -do- | -do- | 2,6-dihydroxy-3-ethyl-4-methyl-pyridine | -do- |
| 12 | -do- | -do- | 2,6-dihydroxy-3-benzyl-4-methyl-pyridine | -do- |
| 13 | -do- | -do- | 2,6-dihydroxy-4-aminocarbonyl pyridine | -do- |
| 14 | -do- | -do- | 2,4,6-trihydroxypyridine | -do- |
| 15 | -do- | -do- | 2,6-dihydroxy-4-ethoxy-carbonylpyridine | -do- |
| 16 | -do- | -do- | 2,6-dihydroxy-3-ethoxy-carbonylpyridine | -do- |
| 17 | -do- | -do- | 2,6-dihydroxy-3-aminocarbonyl-pyridine | -do- |
| 18 | -do- | -do- | 2,6-dihydroxy-3-methylpyridine-4-carboxylic acid | -do- |
| 19 | -do- | -do- | 2,6-dihydroxy-3-methyl-4-hydroxypyridine | -do- |
| 20 | -do- | -do- | 2,6-dihydroxy-3-(3'-chloro-phenyl)-4-aminocarbonyl-pyridine | -do- |
| 21 | -do- | -do- | 2,6-dihydroxy-3-ethoxycarbonyl-4-methylpyridine | -do- |
| 22 | -do- | -do- | 2,6-dihydroxy-3-aminocarbonyl-4-methylpyridine | -do- |
| 23 | -do- | -do- | 2,6-dihydroxy-4-phenylnicotinic-acid | -do- |
| 24 | -do- | -do- | 2,6-dihydroxy-3,4-di(ethoxy-carbonyl)pyridine | -do- |
| 25 | 2,4-dichloro-6-(2',5'-disulpho-anilino-s-triazine | 1,3-phenylenediamine-4-sulphonic acid | 2,6-dihydroxyisonicotinic acid | -do- |
| 26 | cyanuric chloride | 1,4-phenylene diamine-2,5-disulphonic acid | -do- | Yellow |
| 27 | 2,4-dichloro-6-(m-sulphoanilino)-s-triazine | -do- | -do- | -do- |
| 28 | cyanuric chlorice | 1,3-phenylene diamine-4,6-disulphonic acid | 2,6-dihydroxynicotinic acid | Greenish-Yellow |
| 29 | 2,4,5,6-tetrachloro-pyrimidine | -do- | -do- | -do- |
| 30 | 2,4-dichloro-6-(p-sulphoanilino)-s-triazine | 1,4-phenylene diamine-2,5-disulphonic acid | 2,6-dihydroxy-3-ethoxycarbonyl-pyridine | Yellow |
| 31 | 2,4-dichloro-6-2'-methyl-5'-sulphoanilino)-s-triazine | -do- | 2,6-dihydroxy-4-aminocarbonyl pyridine | -do- |
| 32 | 2,4-dichloro-6-(N-ω-sulpho-methylanilino)-s-triazine | 1,3-phenylene diamine-4,6-disulphonic acid | -do- | Greenish-Yellow |
| 33 | 2-methylsulphonyl-6-methyl-4,5-di-chloropyridine | -do- | 2,6-dihydroxy-3,4-dimethyl-pyridine | -do- |
| 34 | acryloyl chloride | -do- | -do- | -do- |
| 35 | 1-(4'-chloro-carbonylphenyl)-4,5-dichloro-pyridaz-6-one | -do- | 2,6-dihydroxy-4-methylpyridine | -do- |
| 36 | 2,4,6-trichloro-5-cyanopyrimidine | -do- | -do- | -do- |
| 37 | 2,3-dibromo-propionyl chloride | -do- | 2,6-dihydroxy-iso-nicotinic acid | -do- |
| 38 | tetrafluorocyclo-butane carbonyl chloride | -do- | 2,6-dihydroxy-4-methylpyridine | -do- |
| 39 | trifluoro cyclo-butene carbonyl chloride | -do- | 2,6-dihydroxy-4-methylpyridine | -do- |
| 40 | β-(tetrafluoro-cyclobutyl)acry-loyl chloride | -do- | 2,6-dihydroxy-3,4-dimethylpyri-dine | -do- |
| 41 | β-(trifluorocyclo-butenyl)acryloyl chloride | -do- | -do- | -do- |
| 42 | 2,4-dichloro-6-(2'-methyl-5'-sulpho-anilino)-s-triazine | -do- | 3-)aminocarbonyl-4-methyl 2,6-dihydroxypyridine | -do- |

| Example | I | II | III | IV Shade |
|---|---|---|---|---|
| 43 | cyanuric chloride | -do- | -do- | -do- |
| 44 | 2,4-dichloro-6-methoxy-s-triazine | -do- | -do- | -do- |
| 45 | cyanuric chloride | 1,4-phenylenediamine-2,5-disulphonic acid | -do- | Reddish-yellow |
| 46 | 2,4-dichloro-6-(m-sulphoanilino)-s-triazine | -do- | 4-methyl-2,6-dihydroxypyridine | -do- |
| 47 | cyanuric chloride | 1,3-phenylenediamine-4,6-disulphonic acid | 2,6-dihydroxy-3-diethyl-aminocarbonyl-4-methyl pyridine | Greenish-yellow |
| 48 | -do- | -do- | 2,6-dihydroxy-3-dimethyl-aminocarbonyl-4-methyl pyridine | -do- |

The 3-aminocarbonyl-4-methyl-2,6-dihydroxypyridine used in the above examples can be obtained by hydrolysis of the corresponding 3-cyano compound by treatment with acid. A typical preparation is as follows:

60 parts of powdered 3-cyano-4-methyl-2,6-dihydroxypyridine are added to 330 parts of stirred 100% sulphuric acid during 1 hour, the temperature of the mixture not being permitted to rise above 20°C during this time. The mixture is then stirred at 50°–55°C for 24 hours and the resulting clear solution poured onto 600 parts of crushed ice. The white precipitate is collected by filtration and washed by slurring with 5% brine solution until the washings are no longer acid to Congo Red indicator paper. The product, after drying in vacuo over phosphorus pentoxide melts with decomposition at 228°C and is found to contain 15.8% N ($C_7H_8N_2O_3$ req. N = 16.7%). The product is dissolved in 500 parts of water by addition of sodium hydroxide solution, reprecipitated by addition of hydrochloric acid and dried. Analysis now gives C = 49.9%, H = 4.6%, N = 16.0%, M.W. by mass spectrum 168 ($C_7H_8N_2O_3$ req. C = 50.0%, H = 4.8%, N = 16.7%, M.W. 168).

SECTION B

This section describes the manufacture of examples of monoazo dyestuffs of the invention by introducing the cellulose-reactive groups into a compound of formula (9) above.

EXAMPLE 49

A solution of 6.7 parts of 1,4-phenylenediamine-2,5-disulphonic acid in 100 parts of water and 10 parts of hydrochloric acid (36°Tw) at 0°–5°C is diazotized by the dropwise addition of 1.73 parts of sodium nitrite dissolved in 12.5 parts of water.

The diazonium solution so formed is then added to a stirred solution of 4.2 parts of 3-aminocarbonyl-4-methyl-2,6-dihydroxypyridine in 250 parts of water at pH 7.0 and 0°–5°C. The pH of the solution is maintained at 6–7 with 10% sodium carbonate solution as required and the mixture stirred at 0°–5°C for 5 hours.

To the solution is then added dropwise, a solution of 4.7 parts of cyanuric chloride in 30 parts of acetone and the mixture stirred at 0°–5°C for 2 hours maintaining the pH at 6–7 with 10% sodium carbonate solution as required. The dyestuff is precipitated by addition of sodium chloride and filtered off. The precipitate is intimately mixed with 1 part of anhydrous disodium hydrogen phosphate and 1.9 parts of anhydrous potassium dihydrogen phosphate, and dried at a temperature between 20°C and 30°C.

When applied to cellulosic materials, the dyestuff obtained gives reddish yellow shades which are fast to washing and to light.

EXAMPLE 50

A mixture of 12.0 parts of 6-acetylamino-2-aminonaphthalene-4,8-disulphonic acid and 10 parts 36°Tw hydrochloric acid in 150 parts of water at 0°–5°C is diazotized by the addition of 17 parts of 2N sodium nitrile solution. Slight excess of nitrous acid is removed by addition of 10% aqueous sulphamic acid solution as required and the diazo suspension is added to a solution of 6.0 parts 3-aminocarbonyl-2,6-dihydroxypyridine in 250 parts of water at 0°–5°C. The pH of the mixture is adjusted to 7.0 by addition of 2N sodium carbonate solution and the mixture stirred at 0°–5°C and pH 7.0 for 3 hours. The monoazo compound is filtered off and dried at 40°C under vacuum.

15 parts of the monoazo compound prepared above are stirred at the boil under a reflux condenser in 700 parts of water. To the mixture is added 160 parts of 36°Tw hydrochloric acid and the mixture is then boiled for 45 minutes. The mixture is cooled to 10°C., the precipitated aminoazo compound filtered off, washed with 150 parts of water and dried.

To a solution of 13.12 parts of the aminoazo compound prepared above in 300 parts of water at 35°–40°C and pH 7.0 is added 6.44 parts of 2,4-dichloro-6-$\beta$-sulphoethyl-amino-s-triazine in 50 parts of water and the mixture stirred at 35°–40°C for 5 hours maintaining the pH at 6–7 by addition of 2N sodium carbonate solution as required.

The dyestuff is precipitated by addition of potassium chloride and dried at 40°C.

When applied to cotton and viscose rayon textile material in the presence of an acid binding agent it yields orange shades which have excellent fastness to wet treatments and to light.

If in place of the 2,4-dichloro-6-$\beta$-sulphoethylamino-s-triazine used above there are used an equivalent amount of any of the following:

EXAMPLE 51. 2,4-dichloro-6-(3',8'-disulpho naphth-1'-ylamino)-s-triazine, 52. 2,4-dichloro-6-(4',8'-disulpho naphth-1'-ylamino)-s-triazine, 53. 2,4-dichloro-(5',7'-disulpho naphth-2'-ylamino)-s-triazine, 54 2,4-dibromo-(5',7'-disulpho naphth-2'-ylamino)-s-triazine, 55. 2,4-dichloro(6',8'-disulpho naphth-2'-ylamino)-s-triazine,
56. 2,4-dibromo-(6',8'-disulfo-napth-2'-ylamino)-s-triazine,
57. 2,4-dichloro-6-n-propoxy-s-triazine,
58. 2,4-dichloro-6-isopropoxy-s-triazine,
59. 2,4-dichloro-6-($\beta$-ethoxy)-ethoxy-s-triazine,
dyestuffs similar in shade and with excellent fastness to wet treatments and to light are obtained.

EXAMPLES 60 to 79

If an equivalent amount of 4-acetylaminoaniline-2,5-disulphonic acid is used in place of 6-acetylamino-2-aminonaphthalene-4,8-disulphonic acid in each of Examples 50 to 59 there are obtained dyestuffs (Examples 60 to 69) which give reddish-yellow shades when applied to cellulose with good fastness to washing and to light.

Alternatively an equivalent amount of 3-acetylaminoaniline-6-sulphonic acid may be used, which, after coupling, hydrolysis, and condensation with any of the dibromo- or dichlor-s-triazines used in Examples 50 to 59, provide dyestuffs (Examples 70 to 79) which give greenish-yellow shades on cellulose with good fastness to washing and to light.

SECTION C

This section describes the manufacture of monoazo dyestuffs of the invention which contain as the reactive group or groups one or more 1:3:5-triazine nuclei substituted by a chlorine atom and by an optionally substituted amino group by reacting the corresponding dyestuff containing at least one 1:3:5-triazine nucleus substituted by two chlorine atoms with ammonia or the appropriate primary or secondary amine under such conditions that one of the chlorine atoms attached to each 1:3:5-triazine nucleus is replaced by an optionally substituted amino group.

In general this replacement can be effected by heating a mixture of ammonia or the amine and the dyestuff in aqueous solution at from about 30° to about 60°C, maintaining the pH of the solution at from 6 to 8 by addition of an alkali to neutralize the liberated hydrogen chloride as it is formed. In the case of aliphatic or other amino compounds of similar basicity, an excess of the amine can be used, the excess acting as acid-binding agent.

This process is illustrated by the following Examples in which parts are by weight:

EXAMPLE 80

A solution of the sodium salt of 26.8 parts of 1,4-diaminobenzene-2,5-disulphonic acid in 500 parts of water is mixed with 50 parts of 2N sodium nitrite solution and cooled to 0° to −3°C. 30 Parts of concentrated hydrochloric acid are then added and the diazonium salt is stirred for 30 minutes at 0°C. Any residual nitrous acid is destroyed by the addition of sulphamic acid. The diazonium chloride so obtained is added to a neutral solution of 12.5 parts of 4-methyl-2,6-dihydroxypyridine in 600 parts of water at 0°–4°C with stirring and the pH adjusted slowly to 7–7.5 until the coupling has been accomplished. The solution so obtained is mixed with 18.5 parts of powdered cyanuric chloride at 0°–8°C and the mixture stirred at pH 5–6 until the amino group of the azo compound has completely reacted. The solution containing the dichloro-s-triazinyl dye is mixed with a solution of the sodium salt of 17.5 parts of sulphanilic acid in 200 parts of water and the mixture stirred at pH 5–6, at 30°–40°C until one chlorine atom of the dichloro-s-triazinyl dye has completely reacted. The dyestuff is precipitated by the addition of sodium chloride, filtered off and dried.

When applied to cotton and viscose rayon textile materials the dyestuff yields bright reddish-yellow shades having excellent fastness to wet treatments such as washing and to light.

EXAMPLE 81

In a manner similar to Example 1, 6.7 parts of 1,3-phenylenediamine-4,6-disulphonic acid dissolved in 50 parts of water at 0°–5°C and pH 5.0 are condensed with 4.63 parts of cyanuric chloride in a mixture of 25 parts of acetone, 50 parts of ice and 50 parts of water, and the product is diazotized and coupled with 4.2 parts of 3-aminocarbonyl-2,6-dihydroxypyridine dissolved in 150 parts of water at pH 7.0 and 0°–5°C. The mixture is stirred at 0°–5°C for 2 hours maintaining the pH at 6–7 with 2N sodium carbonate solution as required. To the solution 2.5 parts of aniline are added, and the solution heated to 35°–40°C for 3 hours maintaining the pH at 6–7 with 2N sodium carbonate solution as required. The dyestuff is isolated by total liquor spray drying, and when applied to cotton and viscose rayon textile materials in conjunction with a treatment with an acid-binding agent it yields bright greenish-yellow shade having excellent fastness to wet treatments such as washing and to light.

The following table describes further examples of monoazo dyestuffs obtained in a similar manner to Example 80 by mono-diazotization of the diamine named in column II, coupling with the pyridone of column III, condensing the cyanuric chloride and then with the amine of column IV, or in a similar manner to Example 81 by first condensing the diamine with cyanuric chloride, diazotizing and coupling with the pyridone and then condensing with one mole of the amine. In the examples 94 to 104, it is more convenient to use a substantial excess, e.g. 5 moles, of the amine and exclude the addition of sodium carbonate.

| Example | II | III | IV | Shade |
|---|---|---|---|---|
| 81 | 1,3-diaminobenzene-4,6-disulphonic acid | 2,6-dihydroxynicotinic acid | sulphanilic acid | greenish-yellow |
| 82 | " | 3-aminocarbonyl-4-methyl-2,6-dihydroxypyridine | p-aminobenzoic acid | " |
| 83 | " | " | anthranilic acid | " |
| 84 | " | " | metaaminobenzoic acid | " |
| 85 | " | " | 4-sulpho-2-amino benzoic acid | " |
| 86 | " | " | 5-sulpho-2-amino benzoic acid | " |
| 87 | " | " | o-anisidine | " |
| 88 | " | " | cresidine | " |
| 89 | " | " | 4-sulpho-2-amino | |

-continued

| Example | II | III | IV | Shade |
|---|---|---|---|---|
| 90 | " | " | anisole 5-sulpho-2-amino anisole | " |
| 91 | " | " | 4-sulpho-2-chloro- aniline | " |
| 92 | " | " | 5-sulpho-2-chloro- aniline | " |
| 93 | " | " | 4-sulpho-N-methyl aniline | " |
| 94 | " | " | methylamine | " |
| 95 | " | " | n-propylamine | " |
| 96 | " | " | iso-propylamine | " |
| 97 | " | " | n-butylamine | " |
| 98 | " | " | β-methoxyethylamine | " |
| 99 | " | " | diethylamine | " |
| 100 | " | " | di-(β-hydroxyethyl) amine | " |
| 101 | " | " | morpholine | " |
| 102 | " | " | cyclohexylamine | " |
| 103 | " | " | benzylamine | " |
| 104 | " | " | hydrazine | " |
| 105 | " | " | 5-sulpho-2-naphthyl- amine | " |
| 106 | " | " | 6-sulpho-2-naphthyl amine | " |
| 107 | " | " | 8-sulpho-1-naphthyl amine | " |
| 108 | " | 4-methyl-2,6-dihydroxy- pyridine | 4-sulpho-1-naphthyl amine | " |
| 109 | " | " | 2-sulpho-1-naphthyl amine | " |
| 110 | " | " | 1-sulpho-2-naphthyl amine | " |
| 111 | " | " | 5-sulpho-2-naphthyl amine | " |
| 112 | " | " | 6-sulpho-2-naphthyl amine | " |
| 113 | " | " | 3-sulpho-1-naphthyl amine | " |
| 114 | " | " | 4-sulpho-2-naphthyl amine | " |
| 115 | " | " | 7-sulpho-2-naphthyl amine | " |
| 116 | " | " | 5-sulpho-1-naphthyl amine | " |
| 117 | " | " | 7-sulpho-1-naphthyl amine | " |

SECTION D

This section describes the manufacture of monoazo dyestuffs of the invention which contain as the reactive group one or more 1:3:5-triazine or pyrimidine nuclei substituted by a quaternary ammonium group or one or more —SO$_3$H,

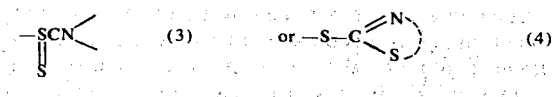

groups, as previously defined herein, by reacting the corresponding dyestuff containing one or more chlorine or bromine atoms attached to the 1:3:5-triazine or pyrimidine nuclei with a tertiary amine, e.g. trimethylamine and pyridine, an alkali metal sulphite, an alkali metal salt of a dithiocarbamate e.g. sodium dimethyl-, diethyl-, diphenyl- or pentamethylene-dithiocarbamate or an alkali metal salt of a 2-mercaptothiazole e.g. 2-mercaptobenzthiazole, 2-mercapto-6-methoxybenzthiazole or 2-mercapto-6-methoxybenzthiazole or 2-mercapto-6-sulphobenzthiazole.

This process can conveniently be carried out by stirring a mixture of the dyestuff and the co-reactant in aqueous solution at a temperature, as appropriate, from 20° to 80°C. followed by isolation in a conventional manner, e.g. by spray-drying the reaction mixture in which the dyestuff has been formed, or by precipitation by salting followed by filtration of the precipitated dyestuff.

This process is illustrated by the following Examples in which parts are by weight:

EXAMPLE 118

A solution of 7.4 parts of cyanuric chloride in 50 parts of acetone is added with stirring to 100 parts of water at 0° to 4°C. A solution of the sodium salt of 7.52 parts of 1:3-diaminobenzene-4-sulphonic acid in 120 parts of water is then added, the temperature of the mixture being maintained at 0° to 4°C. by external cooling. After the reaction is complete the pH of the mixture is raised to between 6.5 and 7 by the addition of sodium carbonate and a solution of the sodium salt of 6.93 parts of metanilic acid in 100 parts of water is added. The mixture is then stirred for 4 hours at 30° to 40°C while the pH of the mixture is maintained between 4.5 and 6 by the addition of sodium carbonate. The resulting solution is cooled to 0°C., 20 parts of a 2N aqueous solution of sodium nitrate are added, followed by 12 parts of a concentrated aqueous solution of hydrochloric acid. The mixture is stirred for 30 minutes and the excess nitrous acid is then destroyed by addition of sulphamic acid. The resulting mixture containing the diazo compound is added with stirring to a slightly alkaline solution of 5.0 parts of 4-methyl-2,6-dihydroxypyridine in 200 parts of water at 0° to 4°C., and the pH is adjusted to between 7.5 and 8.0. After coupling is completed, acetic acid is added to lower the pH to 6.0, the temperature is raised to 20°C., and the dyestuff precipitated by the addition of sodium chloride. The precipitate is then filtered off and redissolved in 500 parts of water at 20°C. with stirring. A solution of 7 parts of trimethylamine in 20 parts of water is then added and the mixture is stirred for 30 minutes. The pH of the mixture is then adjusted to 7.0 by the dropwise addition of hydrochloric acid (36°Tw) and the dyestuff is precipitated by addition of sodium chloride. The precipitate is filtered off and dried at 20°C.

When applied to cotton and viscose rayon textile materials in conjunction with a treatment with an acid binding agent the dyestuff yields bright greenish-yellow shades having excellent fastness to wet treatments such as washing and to light.

EXAMPLE 119

A solution of 13.4 parts of 1,4-phenylenediamine-2,5-disulphonic acid in 150 parts of water is condensed with 9.25 parts of cyanuric chloride in 100 parts of water and 30 parts of acetone at 0°–5°C, then the product is diazotized and coupled with 6.25 parts of 4-methyl-2,6-dihydroxypyridine dissolved in 150 parts of water at 5°–10°C and pH 6.5 in similar manner to Example 1.

The solution is then warmed to 20°–25°C., a solution of 10.6 parts of the sodium salt of 2-mercaptobenzthiazole in 100 parts of water is added and the mixture is stirred at 30°C. for 4 hours. The dyestuff is then precipitated by addition of sodium chloride, filtered and dried.

When applied to cellulose it gives reddish-yellow shades which are fast to washing and to light.

EXAMPLE 120

In place of the 10.6 parts of 2-mercaptobenzthiazole used in Example 119 there are used 8.6 parts of sodium diethyldithio-carbamate when a dyestuff similar in shade is obtained and which has good fastness to washing and to light.

EXAMPLE 121

In place of the 10.6 parts of 2-mercaptobenzthiazole used in Example 119, there are used 17.2 parts of sodium diethyl-dithiocarbamate. The resultant dyestuff also gives reddish-yellow shades when applied to cellulose.

Further examples prepared similarly to Example 118 are disclosed in the Table, when the diamine in Column II is condensed with one equivalent of cyanuric chloride, the product of condensation is then condensed with one equivalent of the compound in Column III and this secondary condensation product is diazotized and coupled with the compound in Column IV. The monochlorotriazinyl azo dyestuff thus obtained is then converted to the quaternary ammonium salt by heating with the compound in Column V, and the shade of the dyestuff when applied to cellulose is given in Column VI.

Alternatively, the product of condensation of cyanuric chloride and the diamine in Column II may be diazotized and coupled to the compound in Column IV, and this dichlorotriazinyl azo dyestuff condensed with the compound in Column III prior to quaternization with the compound in Column V.

| Example | II | III | IV | V | VI |
|---|---|---|---|---|---|
| 122 | 1,3-phenylenediamine-4,6-disulphonic acid | metanilic acid | 3-aminocarbonyl-4-methyl-2,6-dihydroxypyridine | pyridine | Greenish-yellow |
| 123 | -do- | ammonia | -do- | -do- | -do- |
| 124 | -do- | -do- | -do- | trimethylamine | -do- |
| 125 | -do- | -do- | -do- | diazabicyclo octane | -do- |
| 126 | -do- | -do- | -do- | N,N-dimethyl hydrazine | -do- |
| 127 | -do- | -do- | -do- | N-methyl pyrollidine | -do- |
| 128 | 1,4-phenylene diamine-2,5-disulphonic acid | aniline 3,5-disulphonic acid | 4-methyl-2,6-dihydroxypridine | -do- | Reddish-yellow |
| 129 | -do- | -do- | -do- | pyridine | -do- |
| 130 | -do- | -do- | -do- | trimethylamine | -do- |
| 131 | -do- | -do- | -do- | diazabicyclo octane | -do- |
| 132 | 1,3-phenylenediamine 6-sulphonic acid | aniline 2,5-disulphonic acid | -do- | -do- | Greenish-yellow |
| 133 | -do- | -do- | -do- | pyridine | -do- |
| 134 | -do- | -do- | -do- | trimethylamine | -do- |
| 135 | -do- | -do- | -do- | N,N-dimethyl hydrazine | -do- |
| 136 | -do- | 3,5-disulphophenol | -do- | pyridine | -do- |
| 137 | -do- | -do- | -do- | trimethylamine | -do- |

SECTION E

This section describes the manufacture of a highly important class of monoazo dyestuffs of the invention, namely, where the reactive group takes the form of -NH-$L^1$-Q-$L^2$, as defined earlier in this specification, and more especially by formula (7).

Such dyes can be obtained by a number of methods. In certain cases it is possible to synthesize an aromatic amine containing the above group and diazotize and couple with the hydroxypyridone coupling component. More generally, however, it is preferred to form a monoazo dyestuff containing a free amino group and react this with a compound of the formula in terms of the above symbols:

halogen.$L^1$-Q-$L^2$ in which the groupling $L^1$.halogen has a substantially higher reactivity than the group $L^2$ or to form a monoazo dyestuff containing a -$L^1$-halogen grouping, and react successively with a diamine and then with a halogeno-heterocyclic compound which is represented by the formula $L_2$-halogen.

EXAMPLE 138

9.3 parts of cyanuric chloride are condensed with 13.4 parts of 1,3-phenylene diamine-4,6-disulphonic acid at 0°–4°C/pH 4-5 and the dichloro-s-triazine compound is diazotized and coupled with 8.4 parts of 3- aminocarbonyl-4-methyl-2,6-di hydroxypyridine in a similar manner to Example 1.

reacting with the heterocyclic compound of column V.

| Example | II | III | IV | V | Shade |
|---|---|---|---|---|---|
| 139 | 1,3-phenylenediamine-4,6-disulphonic acid | 3-aminocarbonyl-4-methyl-2,6-dihydroxy pyridine | 1,4-phenylenediamine-2-sulphonic acid | cyanuric chloride | greenish-yellow |
| 140 | -do- | -do- | 1,4-phenylenediamine-2,5-disulphonic acid | -do- | -do- |
| 141 | -do- | -do- | 1,3-phenylenediamine-4-sulphonic acid | 2,4,6-trichloro-pyrimidine | -do- |
| 142 | -do- | -do- | -do- | 2,4,5,6-tetra-chloropyrimidine | -do- |
| 143 | -do- | -do- | 1,3-phenylenediamine-4,6-disulphonic acid | cyanuric chloride | -do- |
| 144 | -do- | 4-methyl-2,6-dihydroxypyridine | 1,3-phenylenediamine-4-sulphonic acid | -do- | -do- |
| 145 | -do- | -do- | 1,4-phenylenediamine-2-sulphonic acid | -do- | -do- |
| 146 | -do- | -do- | 1,4-phenylenediamine-2,5-disulphonic acid | -do- | -do- |
| 147 | -do- | -do- | 1,3-phenylenediamine-4,6-disulphonic acid | -do- | -do- |
| 148 | -do- | -do- | 1,3-phenylenediamine-4-sulphonic acid | 2,4-dichloro-6-methoxy-s-triazine | -do- |
| 149 | -do- | 3-aminocarbonyl-4-methyl-2,6-dihydroxy pyridine | 1,4-phenylenediamine-2,5-disulphonic acid | 2,4-dichloro-6-(4'-sulphophenoxy)-s-triazine | -do- |
| 150 | 1,4-phenylenediamine-2,5-disulphonic acid | 4-methyl-2,6-dihydroxypyridine | 1,3-phenylenediamine-4-sulphonic acid | cyanuric chloride | reddish-yellow |

A solution of 9.4 parts of 1,3-phenylene diamine-4-sulphonic acid in 150 parts of water is neutralized with dilute caustic soda solution and added, and the mixture is stirred at 30°–40°C and kept at pH 5–7 until one chlorine atom of the dichloro-s-triazine group has been replaced.

The solution is cooled to 0°–4°C and stirred vigorously and a solution of 9.3 parts of cyanuric chloride in 30 parts of acetone is added. The resultant mixture is stirred at 0°–4°C for 2 hours, keeping the pH at 5–7, then 650 parts of water are added, followed by 15 parts of a 1:2 mixture of disodium hydrogen phosphate and potassium dihydrogen phosphate and then 240 parts of sodium chloride. The precipitated dyestuff is filtered off, mixed with 6 parts of the mixture of phosphates and dried.

The product contains 3.0 hydrolyzable chlorine atoms for each azo group and colors cellulose textile materials in bright greenish-yellow shades of excellent fastness to washing and light.

Further examples, similar to Example 138 are set out in the following table, being obtained by condensing the diamine of column II with one mole of cyanuric chloride, diazotizing and coupling with the pyridone compound of column III, reacting the resultant azo compound with the diamine of column IV and finally reacting with the heterocyclic compound of column V.

EXAMPLE 151

The dichloro-s-triazinyl dyestuff obtained by the diazotization and coupling of the condensation product between 18.5 parts of cyanuric chloride and 26.8 parts of 1,3-phenylene diamine-4,6-disulphonic acid with 12.5 parts of 4-methyl-2,6-dihydroxypyridine is reacted at 30°–40°C/pH 5–7 with the condensation product obtained by reacting 18.5 parts of cyanuric chloride with 18.8 parts of 1,3-phenylenediamine-4-sulphonic acid and 17.3 parts of metanilic acid, until one chlorine atom of the dichloro-s-triazinyl dye has completely reacted. The bis-(monochloro-s-triazinyl)dye is isolated by the addition of sodium chloride. It dyes cotton and viscose rayon in bright greenish-yellow shades having excellent fastness to washing and to light.

Further Examples, similar to that described in Example 151 can be obtained when the product of equimolar proportions of cyanuric chloride and the diamine of Column II is diazotized and coupled with the coupling component of Column III. The monoazo compound is then reacted with an equimolar proportion of the product of the condensation of 1 mole of the heterocyclic compound of Column IV and 1 mole of the diamine of Column V.

| Example | II | III | IV | V | Shade |
|---|---|---|---|---|---|
| 152 | 1,3-phenylenediamine-4,6-disulphonic acid | 4-methyl-2,6-dihydroxypyridine | 2,4-dichloro-6-amino-s-triazine | 1,3-phenylenediamine-4-sulphonic acid | greenish yellow |
| 153 | -do- | 2,6-dihydroxyiso-nicotinic acid | -do- | -do- | -do- |
| 154 | -do- | 3-aminocarbonyl-4-methyl-2,6-dihydroxy pyridine | -do- | -do- | -do- |
| 155 | -do- | -do- | 2,4-dichloro-6-(2'-methyl-5'-sulphoanilino)-s-triazine | -do- | -do- |
| 156 | -do- | -do- | 2,4,6-trichloro-pyrimidine | -do- | -do- |
| 157 | -do- | -do- | 2,4,5,6-tetra-chloropyrimidine | -do- | -do- |
| 158 | -do- | -do- | 2,4-dichloro-6-(3'-sulpho-anilino)-s- | 1,4-phenylenediamine-2-sulphonic acid | -do- |

| Example | II | III | IV | V | Shade |
|---|---|---|---|---|---|
| 159 | -do- | -do- | 2,4-dichloro-6-amino-s-triazine | -do- | -do- |
| 160 | -do- | -do- | 2,4-dichloro-6-β-hydroxyethyl-amino-s-triazine | 1,4-phenylenediamine-2,5-disulphonic acid | -do- |
| 161 | -do- | -do- | -do- | 1,3-phenylenediamine-4,6-disulphonic acid | -do- |
| 162 | 1,3-phenylenediamine-4-sulphonic acid | -do- | -do- | -do- | -do- |
| 163 | -do- | -do- | -do- | 1,4-phenylenediamine-2,5-disulphonic acid | -do- |
| 164 | 1,4-phenylenediamine-2-sulphonic acid | -do- | -do- | -do- | yellow |
| 165 | 1,3-phenylenediamine-4,6-disulphonic acid | 3-methylaminocarbonyl-4-methyl-2,6-dihydroxy pyridine | 2,4-dichloro-6-amino-s-triazine | 1,3-phenylenediamine-4,6-disulphonic acid | greenish yellow |
| 166 | -do- | 4-methyl-2,6-dihydroxypyridine | cyanuric chloride | ethylene diamine | -do- |
| 167 | -do- | -do- | 2,4-dichloro-6-(2'-methyl-5'-sulphoanilino)-s-triazine | hydrazine | -do- |
| 168 | -do- | -do- | -do- | N-methylhydrazine | -do- |
| 169 | -do- | -do- | 2,4-dichloro-6-methoxy-s-triazine | 1,4-phenylenediamine-2,5-disulphonic acid | -do- |
| 170 | -do- | -do- | 2,4-dichloro-6-(4'-sulphophenoxy)-s-triazine | -do- | -do- |

EXAMPLE 171

The process of Example 138 is repeated up to the end of the second condensation with cyanuric chloride. Then, instead of isolating the dyestuff, 18 parts of ammonia liquor (s.g. 0.88) are added, and the mixture is heated to 30°C and stirred at 30°–40°C for 30 minutes. The pH is then adjusted to 6.5 with hydrochloric acid (36°Tw) and the dyestuff is precipitated by the addition of 15% w/v sodium chloride. The precipitate is filtered off, washed with a 10% solution of sodium chloride and dried in vacuo at 40°C. Upon analysis it is found to contain 1.95 moles of chlorine per mole of dyestuff. It yields bright greenish-yellow shades when applied to cellulose having good fastness to washing and light.

Further examples, similar in shade to that obtained in Example 138 are obtained by condensing one mole of the diamine of column II with one mole of cyanuric chloride, diazotizing the product and coupling with one mole of the coupling component named in column III, the product being then reacted successively with one mole of the diamine of column IV one mole of cyanuric chloride and one mole of the compound in column V.

| Example | II | III | IV | V |
|---|---|---|---|---|
| 172 | 1,3-phenylenediamine-4,6-disulphonic acid | 3-aminocarbonyl-4-methyl-2,6-dihydroxy pyridine | 1,4-phenylenediamine-2-sulphonic acid | ammonia |
| 173 | -do- | -do- | 1,4-phenylenediamine-2,5-disulphonic acid | -do- |
| 174 | -do- | -do- | 1,3-phenylenediamine-4,6-disulphonic acid | ethylamine |
| 175 | -do- | -do- | 1,3-phenylenediamine-4-sulphonic acid | metanilic acid |
| 176 | -do- | -do- | -do- | ethanolamine |
| 177 | -do- | -do- | -do- | sulphanilic acid |
| 178 | -do- | -do- | -do- | 4-sulpho-2-aminotoluene |
| 179 | -do- | -do- | -do- | 5-sulpho-2-aminotoluene |
| 180 | -do- | -do- | -do- | N-methylaniline |
| 181 | -do- | -do- | -do- | 3,5-disulphoaniline |
| 182 | -do- | -do- | -do- | 4,8-disulpho-1-naphthylamine |
| 183 | -do- | -do- | -do- | 3,8-disulpho-1-naphthylamine |
| 184 | -do- | -do- | -do- | 4,8-disulpho-2-naphthylamine |
| 185 | -do- | -do- | -do- | 5,7-disulpho-2-naphthylamine |
| 186 | -do- | -do- | -do- | 4-sulpho-1-naphthylamine |
| 187 | -do- | -do- | -do- | 5-sulpho-1-naphthylamine |
| 188 | -do- | -do- | -do- | 6-sulpho-1-naphthylamine |
| 189 | -do- | -do- | -do- | 7-sulpho-1-naphthylamine |
| 190 | -do- | -do- | -do- | 8-sulpho-1-naphthylamine |
| 191 | -do- | -do- | -do- | 5-sulpho-2-naphthylamine |
| 192 | -do- | -do- | -do- | 6-sulpho-2-naphthylamine |
| 193 | -do- | -do- | -do- | 7-sulpho-2-naphthylamine |
| 194 | -do- | -do- | -do- | 3,6,8-trisulpho-1-naphthylamine |
| 195 | -do- | -do- | -do- | 4,6,8-trisulpho-1-naphthylamine |

-continued

| Example | II | III | IV | V |
|---|---|---|---|---|
| 196 | -do- | -do- | -do- | 3-sulpho-N-methylaniline |
| 197 | -do- | -do- | -do- | 4-sulphophenol |
| 198 | -do- | -do- | -do- | 3,5-disulphophenol |
| 199 | -do- | -do- | -do- | 5-sulpho-2-aminobenzoic acid |
| 200 | -do- | -do- | -do- | 4-sulpho-2-aminobenzoic acid |
| 201 | -do- | -do- | -do- | aniline |
| 202 | -do- | 4-methyl-2,6-dihydroxypyridine | -do- | ammonia |
| 203 | -do- | -do- | 1,4-phenylenediamine-2-sulphonic acid | ethanolamine |
| 204 | -do- | -do- | 1,4-phenylenediamine 2,5-disulphonic acid | ammonia |
| 205 | -do- | -do- | 1,3-phenylenediamine-4,6-disulphonic acid | -do- |
| 206 | -do- | 3-aminocarbonyl-4-methyl-2,6-dihydroxy pyridine | 1,3-phenylenediamine-4-sulphonic acid | -do- |
| 207 | 1,3-phenylenediamine-4-sulphonic acid | -do- | 1,4-phenylenediamine-2,5-disulphonic acid | -do- |
| 208 | -do- | -do- | 1,3-phenylenediamine-4-sulphonic acid | ethanolamine |

SECTION F BISAZO DYES

A large number of bisazo dyes of the invention can be obtained by coupling 2,6-dihydroxypyridine with a diazotized aminoazo compound containing a cellulose-reactive group. The latter compounds can conveniently be obtained by diazotizing an aromatic amine containing a cellulose-reactive group (for examples of which see Section A above) and coupling the resultant diazonium compound with a coupling component which itself contains a diazotizable amino group. Included in the latter are a number of aminonaphthol sulphonic acids, but the preferred coupling components for use in this connection are p-coupling amines of the benzene and naphthalene series, e.g.:

o- and m-toluidines
o- and m-anisidines
cresidine
m-aminoacetanilide and other monoacylated phenylene diamines
m-aminophenylurea
1-naphthylamine
6- and 7-sulpho-1-naphthylamines The dyes obtained in this manner conform to the general formula:

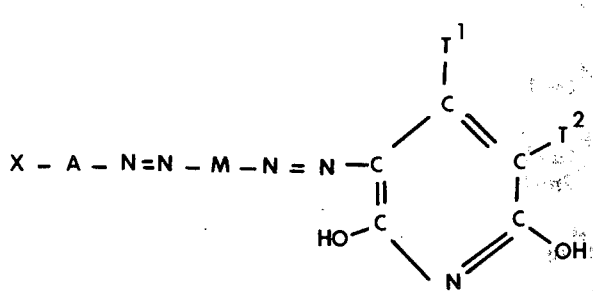

wherein X, $T^1$ and $T^2$ have the meanings stated, X - A - is the residue of the diazotizable amine containing a cellulose-reactive group and -M- is the residue of the coupling component containing a diazotizable group. Preferably, A will represent a mono- or di-sulpho-m- or p-phenylene radical or a disulphonaphthylene radical and M will represent a 1,4-phenylene radical which may be substituted, e.g. by methyl, methoxy, acylamino and/or ureido or a 1,4-naphthylene radical which may be substituted in the 6- or 7-position by $SO_3H$.

The following examples and Table depict a number of new bisazo dyestuffs of the invention obtained in this manner:

EXAMPLE 209

The diazo component obtained by reacting 18.5 parts of cyanuric chloride with 26.8 parts of 1,4-phenylenediamine-3,6-disulphonic acid at 0°–5°C/pH 3.5 – 5.0 and 17.3 parts of metanilic acid is diazotized and coupled with 13.7 parts of 2-methoxy-5-methylaniline in the presence of sodium acetate. The amino azo compound so obtained is diazotized and coupled with 12.5 parts of 4-methyl-2,6-dihydroxypyridine to give a bis-azo dyestuff dyeing cotton and viscose rayon in bluish-red shades having excellent fastness to washing and to light.

The following table describes further examples obtained in similar manner to Example 209. One mol of the diamine in Column II is condensed with one mole of the acylating agent in Column III, and, where described, the product is then condensed with a further equivalent of the compound described in Column IV. The product is then diazotized and coupled with the coupling component described in Column V. The aminoazo compound so formed is diazotized and coupled with the pyridone coupling component described in Column VI to form a bis-azo dyestuff. The shades obtained when applied to cellulose are described in Column VII.

| Example | II | III | IV | V | VI | VIII |
|---|---|---|---|---|---|---|
| 210 | 1,4-phenylenediamine-2,5-disulphonic acid | cyanuric chloride | — | 1-aminonaphthalene-6-sulphonic acid | 4-methyl-2,6-dihydroxy-pyridine | Bluish-red |
| 211 | -do- | -do- | — | 1-aminonaphthalene 7-sulphonic acid | -do- | -do- |

-continued

| Example | II | III | IV | V | VI | VIII |
|---|---|---|---|---|---|---|
| 212 | -do- | -do- | — | -do- | 3-aminocarbonyl-4-methyl-2,6-dihydroxy pyridine | -do- |
| 213 | -do- | -do- | — | -do- | 2,6-dihydroxy isonicotinic acid | -do- |
| 214 | -do- | -do- | — | 1-aminonaphthalene-6-sulphonic acid | -do- | -do- |
| 215 | -do- | -do- | — | -do- | 3-aminocarbonyl-4-methyl-2,6-dihydroxy pyridine | -do- |
| 216 | -do- | -do- | metanilic acid | -do- | -do- | -do- |
| 217 | 1,3-phenylenediamine 4,6-disulphonic acid | -do- | -do- | -do- | 4-methyl-2,6-dihydroxy pyridine | -do- |
| 218 | -do- | -do- | — | -do- | -do- | -do- |
| 219 | 1,3-phenylenedamine 4,6-disulphonic acid | tetrachloro pyrimidine | — | 1-aminonaphthalene-6-sulphonic acid | 4-methyl-2,6-dihydroxy pyridine | Bluish-red |
| 220 | -do- | 2-methylsulphenyl-6-methyl-4,5-dichloropyrimidine | — | -do- | -do- | -do- |
| 221 | -do- | cyanuric chloride | 4-β-sulphato-ethyl sulphon-ylaniline | -do- | -do- | -do- |
| 222 | -do- | 2,4-dichloro-6-methoxy-s-triazine | — | -do- | -do- | -do- |
| 223 | -do- | cyanuric chloride | ammonia | -do- | -do- | -do- |
| 224 | -do- | -do- | metanilic acid | -do- | -do- | -do- |
| 225 | -do- | -do- | — | 1-aminonaphthalene-7-sulphonic acid | -do- | -do- |
| 226 | 1,3-phenylenediamine 4,6-disulphonic acid | -do- | 4-sulphophenol | 1-aminonaphthalene-6-sulphonic acid | -do- | -do- |
| 227 | -do- | -do- | — | -do- | 3-aminocarbonyl-4-methyl-2,6-dihydroxy pyridine | -do- |
| 228 | -do- | -do- | — | -do- | 2,6-dihydroxyiso nicotinic acid | -do- |

A different class of bisazo dyes of the invention are obtained by condensing 2 moles of a monoazo dye of the invention containing a dichloro-s-triazine group with 1 mole of a diamino compound. The resultant class of compounds are represented by the general formula:

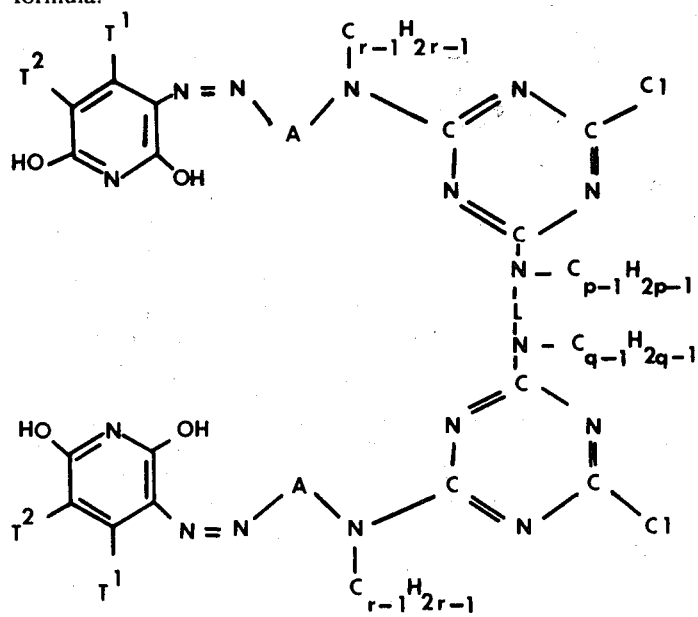

wherein the symbols $T^1$, $T^2$, A, L, $p$, $q$ and $r$ have the meanings stated earlier.

As diamino compounds which may be used, there may be mentioned:
 hydrazine and piperazine,
 aliphatic amines, e.g.:
  ethylene diamine
  1,2- and 1,3-propylenediamines
  1,6-hexamethylenediamine
  2,2'-diaminodiethylether
 mono- and di-cyclic diamines of the benzene series, e.g.:
  1,3-diaminobenzene-4-sulphonic and 4,6-disulphonic acids,
  1,4-diaminobenzene-2-sulphonic and 2,5-disulphonic acids,
  1,3- and 1,4-phenylenediamines,
  benzidine and benzidine-2,2'-disulphonic acid,
  4,4'-diaminodiphenylurea and its 2,2'- and 3,3'-disulphonic acids, 3,3'-diaminodiphenylurea,
4,4'-diaminodiphenylmethane,
4,4'-diaminodiphenyl sulphone,
4,4'-diaminodiphenyl ether,
4,4'-diaminostilbene-2,2'-disulphonic acid,
4,4'-diaminodiphenoxyethane-2,2'-disulphonic acid, and naphthylene diamines, e.g.:
2,6-diaminonaphthalene-1,5-disulphonic acid and
1,5-diaminonaphthalene-3,7-disulphonic acid.

Dyestuffs of the above class in which r has the value 1 can alternatively be obtained by condensing 2 moles of cyanuric chloride with 1 mole of the diamine of formula

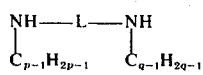

and with 2 moles of a diamine of formula $NH_2.A.NH_2$ then tetrazotizing the resultant product and coupling with 2 moles of 2,6-dihydroxypyridine.

The following examples and table depict a number of new azo dyestuffs of the invention obtained by these methods. In the table, column II names the 2,6-dihydroxypyridine used, column III names the diamine of formula $NH_2.A.NHC_{r-1}H_{2r-1}$ and column IV the diamine of formula

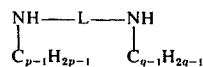

EXAMPLE 229

A solution of 6.7 parts of 1,3-phenylenediamine-4,6-disulphonic acid is 50 parts of water at 0°–5°C and pH 5.0 is added rapidly with stirring to a suspension prepared by dissolving 4.63 parts of cyanuric chloride in 25 parts of acetone and adding the resulting solution to 50 parts of water and 50 parts of ice. The mixture is stirred for 2 hours at 0°–5°C maintaining the pH at 4–5 by addition of 2N sodium carbonate solution.

A solution of 5 parts of 4,4'-diaminodiphenylurea-2,2'-disulphonic acid in 50 parts of water at pH 6.5 is added rapidly to the solution prepared in the preceding paragraph and the mixture is stirred and heated at 30°–35°C for 1 hour, the pH being maintained at 6–7 by adding 2N sodium carbonate solution.

The solution is then cooled to 0°–5°C and 15 parts of 36°Tw hydrochloric acid added. The mixture is then tetrazotized by addition of 3.46 parts of sodium nitrite in 25 parts of water. The tetrazo suspension is then added to a suspension of 8.4 parts of 3-aminocarbonyl-4-methyl-2,6-dihydroxypyridine in 75 parts of water at 0°–5°C and pH 7.0. The mixture is stirred at 0°–5°C for 4 hours, the pH being maintained at 6–7 by addition of 2N sodium carbonate solution, and is finally stirred at 20°C for 16 hours. The dyestuff is precipitated by addition of potassium chloride, collected by filtration and washed with 50 parts of a saturated solution of potassium chloride. After drying in vacuo at 40°C, the dyestuff is found to contain 1.7 moles of hydrolyzable chlorine per mol of dye.

When applied to cellulose the dyestuff gives bright yellow shades of good fastness to washing and light.

EXAMPLE 230

18.5 Parts of cyanuric chloride are condensed with 26.8 parts of 1,3-phenylenediamine-4,6-disulphonic acid at 0°–4°C/pH 4.5 and the dichloro-s-triazinyl intermediate diazotized and coupled with 12.5 parts of 4-methyl-2,6-dihydroxypyridine in a similar manner to Example 1. 13.4 parts of 1,4-phenylenediamine2,5-disulphonic acid are added and the mixture is heated at 30°–40°C/pH 5–7 until one chlorine atom from each of two moles of the dichloro-s-triazinyl dyestuff has completely reacted to give a bis-(monochloro-s-triazinyl)-dye which is then isolated by the addition of sodium chloride.

The dyestuff dyed cotton and viscose rayon in bright greenish-yellow shades having excellent fastness to wet treatments such as washing and to light.

| Example | II | III | IV | Shade |
|---|---|---|---|---|
| 231 | 4-methyl-2,6-dihydroxypyridine | 1,3-diaminobenzene-4,6-disulphonic acid | 4,4'-diaminodiphenylurea-2,2'-disulphonic acid | greenish yellow |
| 232 | -do- | -do- | 4,4'-diaminostilbene-2,2'-disulphonic acid | -do- |
| 233 | -do- | -do- | 4,4'-diaminodiphenoxyethane-2,2'-disulphonic acid | -do- |
| 234 | -do- | -do- | benzidine-2,2'-disulphonic acid | -do- |
| 235 | 3-aminocarbonyl-4-methyl-2,6-dihydroxy pyridine | -do- | -do- | -do- |
| 236 | -do- | 1,3-diaminobenzene-4-sulphonic acid | 4,4'-diaminostilbene-2,2'-disulphonic acid | -do- |
| 237 | -do- | -do- | 4,4'-diaminodiphenoxyethane-2,2'-disulphonic acid | -do- |
| 238 | -do- | -do- | ethylenediamine | -do- |
| 239 | 2,6-dihydroxyiso nicotinic acid | 1,4-diaminobenzene-2,5-disulphonic acid | 1,4-phenylenediamine-2-sulphonic acid | reddish yellow |
| 240 | -do- | -do- | m-phenylenediamine | -do- |
| 241 | -do- | -do- | benzidine | -do- |
| 242 | -do- | 1,3-diaminobenzene-4,6-disulphonic acid | 4,4'-diaminodiphenyl methane | greenish yellow |
| 243 | -do- | -do- | 4,4'-diaminodiphenyl urea | -do- |
| 244 | -do- | -do- | 3,3'-diaminodiphenyl urea | -do- |
| 245 | -do- | -do- | 1,3-propylene diamine | -do- |
| 246 | -do- | -do- | 4,4'-diaminobenzidine-2,2'-disulphonic acid | -do- |
| 247 | -do- | -do- | 4,4'-diaminostilbene-2,2'-disulphonic acid | -do- |
| 248 | -do- | -do- | 4,4'-diaminodiphenoxyethane-2,2'-disulphonic acid | -do- |
| 249 | -do- | -do- | 4,4'-diaminodiphenylurea-2,2'-disulphonic acid | -do- |
| 250 | -do- | 1,4-diaminobenzene-2-sulphonic acid | 2,6-diaminonaphthalene-4,8-disulphonic acid | reddish yellow |
| 251 | -do- | -do- | 1,5-diaminonaphthalene-3,7-disulphonic acid | -do- |

-continued

| Example | II | III | IV | Shade |
|---|---|---|---|---|
| 252 | 3-aminocarbonyl-2,6-dihydroxypyridine | 1,4-diaminobenzene-2,5-disulphonic acid | 4,4'-diaminodiphenyl sulphone | reddish yellow |
| 253 | -do- | -do- | hydrazine | -do- |
| 254 | -do- | -do- | 4,4'-diaminodiphenyl ether | -do- |
| 255 | -do- | -do- | piperazine | -do- |
| 256 | -do- | 1,3-diaminobenzene-4-sulphonic acid | 1,3-phenylenediamine-4-sulphonic acid | greenish yellow |
| 257 | -do- | -do- | 1,4-phenylenediamine-2-sulphonic acid | -do- |
| 258 | -do- | 1,3-diaminobenzene-4,6-disulphonic acid | 4,4'-diaminobenzidine-2,2'-disulphonic acid | -do- |
| 259 | -do- | -do- | 4,4'-diaminostilbene-2,2'-disulphonic acid | -do- |
| 260 | -do- | -do- | 4,4'-diaminodiphenoxyethane-2,2'-disulphonic acid | -do- |

EXAMPLE 261

In place of the 10.6 parts of 2-mercaptobenzthiazole used in Example 119 there is added 10.05 parts of 4,4'-diaminodiphenyl-urea-2,2'-disulphonic acid dissolved in 100 parts of water at pH 6.5. The solution is then stirred at 35°–40°C for 5 hours maintaining the pH at 6–7 with 2N sodium carbonate solution as required.

To the solution there are then added 5 parts of pyridine and 7.5 parts of sodium sulphite and the mixture is stirred at 60°C until sulphiting is complete, as judged by estimation of liberated sodium chloride. The dyestuff is precipitated by addition of potassium chloride and dried. When applied to cellulose it gives reddish yellow shades which have good fastness to washing and to light.

EXAMPLE 262

In place of the 10.05 parts of 4,4'-diaminodiphenylurea-2,2'-disulphonic acid used in Example 261 there are used 10.1 parts of 4,4'-diaminodiphenoxyethane-2,2'-disulphonic acid when a dyestuff similar in shade with good fastness to washing and to light is obtained.

EXAMPLE 263

A solution of 15.5 parts of the monoazo compound obtained when diazotized 6-nitro-1-amino-2-hydroxynaphthalene-4-sulphonic acid is coupled with 3-aminocarbonyl-4-methyl-2,6-dihydroxypyridine is stirred in 500 parts of water at 50°–55°C and pH 8.5. A solution of 4.8 parts of sodium sulphide monohydrate in 40 parts of water is added to the above solution and the mixture stirred at 50°–55°C for 3 hours. The temperature of the solution is raised to 65°–70°C, a further 8.4 parts of sodium sulphide monohydrate in 70 parts of water added and the solution stirred at 65°–70°C for 3 hours. A further solution of 12 parts sodium sulphide monohydrate in 100 parts of water is added and the solution stirred at 65°–70°C for 3½ hours. The solution is then stirred at 20°C for 18 hours, the aminoazo compound precipitated by addition of potassium acetate, filtered, washed well with ethyl alcohol and dried.

A solution of 14.4 parts of the aminoazo compound prepared above is stirred in 500 parts of water at 70°C and pH 6.0. To the solution is added a solution of 4.6 parts of cobalt acetate in 50 parts of water and the mixture stirred at 70°C for 2 hours. The solution is cooled, the cobalt containing dyestuff precipitated by addition of salt, filtered and dried.

A solution of the primary condensation product of 4.1 parts of cyanuric chloride and 3.5 parts of 1-aminobenzene-3-sulphonic acid in 100 parts of water is added to a solution of 9.2 parts of the 1:2-cobalt complex prepared above in 300 parts of water, and the mixture stirred at 40°–45°C. for 5 hours maintaining the pH at 6–7 by addition of 2N sodium carbonate solution as required. The solution is then cooled to 20°C and the dyestuff precipitated by addition of potassium chloride, and dried.

When applied to cellulosic materials in the presence of an acid binding agent reddish brown shades are obtained which have good fastness properties to washing and to light.

The corresponding 1,2-chromium complex (Example 264) gives dull red shades when applied to cellulose.

In place of the 6-nitro-1-amino-2-hydroxynaphthalene-4-sulphonic acid used above, there may be used 6-nitro-2-aminophenol-4-sulphonic acid; the product (Example 265) obtained gives orange shades when applied to cellulosic materials in the presence of an acid binding agent, which have good fastness to washing and to light. The analogous 1,2-chromium complex (Example 266) gives red shades when applied to cellulose.

We claim:
1. A monoazo dyestuff of the formula

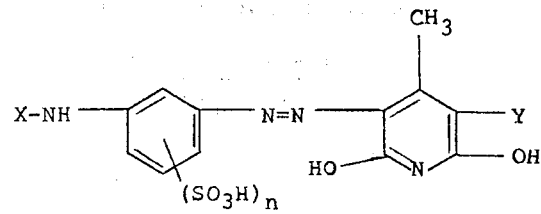

wherein
n is 1 or 2;
Y is selected from the group consisting of hydrogen, lower alkyl and $CONH_2$; and
X is a cellulose reactive group selected from the class consisting of
1. 5-cyano-2,4-dichloropyrimidyl,
2. 5-cyano-2,6-dichloropyrimidyl,
3. 5-chloro-6-methyl-2-methylsulphonylpyrimidyl and (4) 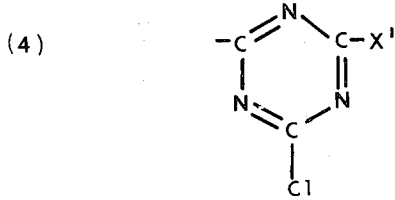

wherein X' is selected from the group consisting of Cl, NH₂, lower alkoxy, lower alkylamino, di-(lower alkyl) amino, di-(hydroxy-lower alkyl) amino, morpholino, cyclohexylamino, benzylamino, sulphoanilino, disulphanilino, carboxyanilino, sulphocarboxyanilino, anisidino, sulphoanisidino, sulphotoluidino, sulphochloroanilino, sulphonaphthylamino and

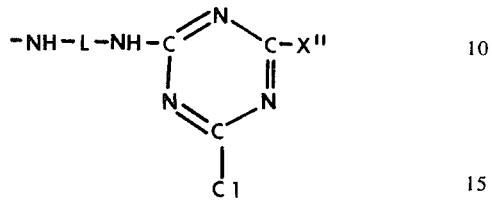

wherein L is mono- or di-sulphonated phenylene and X'' is selected from the group consisting of Cl, NH₂, lower alkoxy lower alkylamino, hydroxy-lower alkylamino, anilino, sulphoanilino, disulphoanilino, sulphotoluidino, sulphocarboxyanilino, sulphonaphthylamino, disulphonaphthylamino and trisulphonaphthylamino.

2. A monoazo dyestuff as claimed in claim 1 having the formula

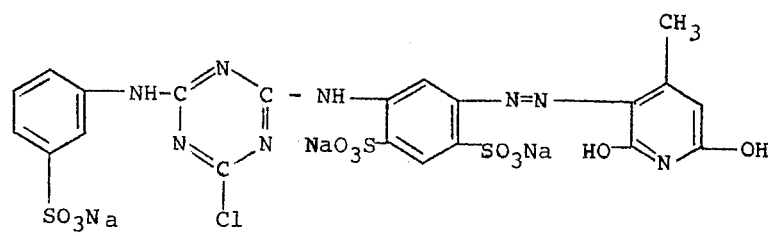

3. A monoazo dyestuff as claimed in claim 1 having the formula

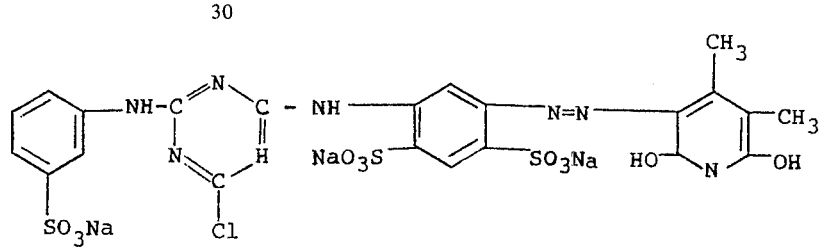

4. A monoazo dyestuff as claimed in claim 1 having the formula

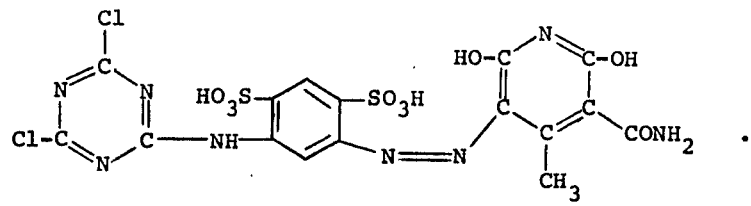

* * * * *